United States Patent [19]

Takaoka et al.

[11] 4,365,883

[45] Dec. 28, 1982

[54] FOCUSING SCREEN HOLDING DEVICE

[75] Inventors: Yukio Takaoka, Asaka; Keisuke Haraguchi, Ranzan; Shiyouichi Yamaka, Kamifukuoka, all of Japan

[73] Assignee: Asahi Kogaku Kogyo Kabushiki Kaisha, Tokyo, Japan

[21] Appl. No.: 284,743

[22] Filed: Jul. 20, 1981

[30] Foreign Application Priority Data

Sep. 11, 1980 [JP] Japan ........................... 55-129666[U]

[51] Int. Cl.³ ....................... G03B 13/00; G03B 19/12
[52] U.S. Cl. .................................. 354/152; 354/200
[58] Field of Search ............... 354/151, 152, 155, 161, 354/200, 201, 219, 224, 225

[56] References Cited

U.S. PATENT DOCUMENTS

| 2,981,166 | 4/1961 | Madge | 354/200 |
| 3,174,417 | 3/1965 | Sauer et al. | 354/155 |
| 4,132,472 | 1/1979 | Urano et al. | 354/155 |
| 4,187,016 | 2/1980 | Ishizaka | 354/200 X |
| 4,338,010 | 7/1982 | Takahashi | 354/152 |
| 4,346,973 | 8/1982 | Katsuma et al. | 354/152 |

Primary Examiner—John Gonzales
Attorney, Agent, or Firm—Sughrue, Mion, Zinn, Macpeak and Seas

[57] ABSTRACT

A focusing screen holding device for a single-lens reflex camera including a focusing screen, a focusing screen holding frame including focusing adjusting screws, a focusing screen retaining spring, and a hinge on one leaf of which the focusing screen retaining spring is mounted and which has an outer end with a hook engagable with the camera body. The second leaf of the spring is fixedly secured to the camera body so that the focusing screen holding frame is swingable about the shaft of the hinge. The focusing screen is accessible through the lens mount opening to replace and adjust the position of the focusing screen.

3 Claims, 4 Drawing Figures

FOCUSING SCREEN HOLDING DEVICE

BACKGROUND OF THE INVENTION

The present invention relates to a focusing screen holding device for a single-lens relex camera.

The focusing screen in a single-lens relex camera is used to form an optical image through a mirror thereby to conduct focusing and framing. For this purpose, it is necessary to mount the focusing screen at a position equivalent to that of the emulsion layer of the film. However, because of dimensional tolerances of various components, it is impossible to mount the focusing screen at an accurate position directly upon assembling the components. That is, it is always necessary to adjust the position of the focusing screen.

Typical examples of a conventional focusing screen adjusting device are shown in FIGS. 1 and 2.

In the case of FIG. 1, a pentaprism 1 is fixedly secured to a prism support 3 which is fixedly secured to portions 2a and 2b of the camera body. A focusing screen 4 is supported by a focusing screen frame 5. The frame 5 is supported through springs 14 on portions 2c and 2d of the body in such a manner that it is urged upwardly as viewed in the figure by the springs and the position of the frame 5 can be adjusted by adjusting screws 12.

With this device, focusing adjustment can be satisfactorily carried out. However, the conventional focusing screen adjusting device is disadvantageous in the following points: The adjustment of the focusing screen position must be carried out before the dial, the winding lever, etc. on the upper cover are attached during assembly of the camera, and therefore the degree of freedom in assembling the camera is considerably small. In addition, in repairing or adjusting a camera, the adjustment of the focusing screen position cannot be accomplished without removing relatively many components. Furthermore, if dust sticks onto the focusing screen 4, it cannot be removed without removing and disassembling essential components such as the pentaprism 1 and the prism support 3 of the camera. Moreover, if the focusing screen 4 is scratched, it cannot be replaced without disassembling many components of the camera.

In the case of FIG. 2, a pentaprism 1 is secured to a prism support 3 which is fixedly secured to portions 2a and 2b of the camera body. A leaf spring 6 connected to a focusing screen frame 5, which supports a focusing screen 4, depresses the prism support 3, thereby urging the focusing screen frame 5 downwardly as viewed in FIG. 2. On the other hand, the focusing screen frame 5 is pushed upwardly in FIG. 2 by a focusing adjusting screw 8 which is supported by a mirror box 7 secured to portions (not shown) of the camera body. With this construction, after the camera has been completely assembled, adjustment of the focusing screen position as well as the adjustments of the dimensional errors of other components, is carried out by adjusting the focusing adjusting screw 8 with a screwdriver inserted through an opening in a mount 9. However, this conventional focusing screen adjusting device is also disadvantageous in that dust cannot be removed from the focusing screen 4 and a scratched focusing screen 4 cannot be replaced without removing or disassembling relatively many components.

SUMMARY OF THE INVENTION

Overcoming the drawbacks of the prior art constructions, the invention provides a focusing screen holding device for a single-lens reflex camera including a focusing screen, a focusing screen holding frame provided with a focusing adjusting screws, a focusing screen retaining spring, and a hinge having first and second leaves. The focusing screen holding frame is mounted on the first leaf and the second leaf of the spring is secured to the body of the camera. A hook is formed at the outer end of the first leaf which is engagable with the camera body. Thus, the focusing screen retaining frame is fixedly secured to the camera body with a spring exerting a depressing force on the focusing screen. With this construction, the focusing screen is accessible through an opening of a lens mount to adjust and replace the focusing screen.

DESCRIPTION OF THE PREFERRED EMBODIMENTS

The above-described difficulties accompanying a conventional focusing screen adjusting device have been eliminated by the provision of the present invention. A preferred embodiment of the invention will be described with reference to FIGS. 3 and 4.

Figure 1:
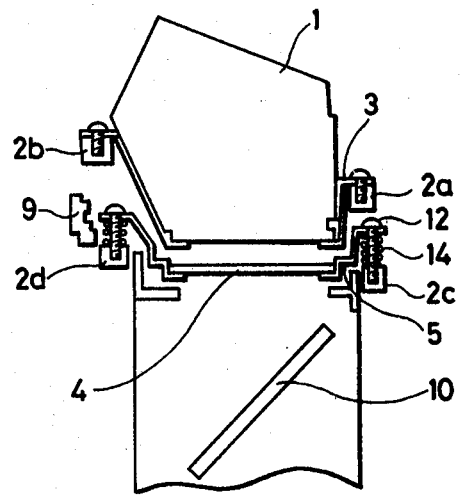
FIGS. 1 and 2 are sectional views showing essential components of examples of a conventional focusing screen adjusting device.
Figure 2:
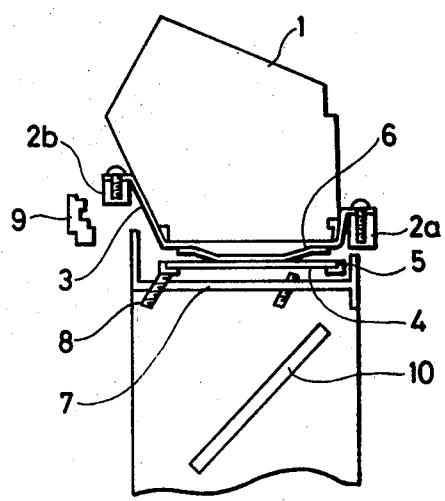
Figure 3:
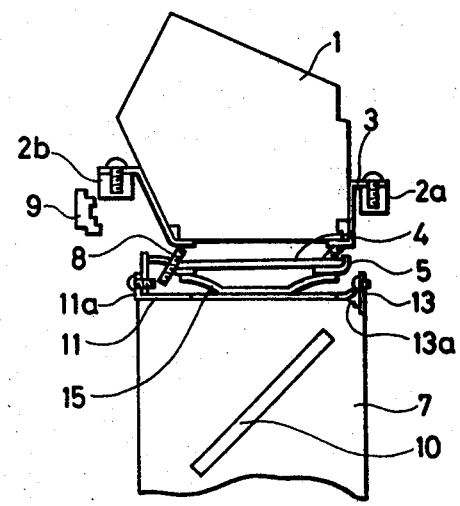
FIG. 3 is a sectional view showing essential components of a focusing screen holding device according to the invention.

As shown in FIG. 3, a pentaprism 1 is fixedly secured to a prism support 3 which is also fixedly secured to portions 2a and 2b of the camera body. A focusing screen 4 is supported by a focusing screen frame 5. The focusing screen frame is urged upwardly (as viewed in FIG. 3) by a focusing screen retaining spring 15. The spring 15 is mounted on a special hinge with leaves 11 and 13 as shown in FIG. 3. More specifically, the spring 15 is mounted on the leaf 11 while the other leaf 13 is secured to the mirror box 7 so that the leaf 11 is swingable about a shaft 13a. The leaf 11 has a hook 11a at the free end with which the hinge is secured to the mirror box 7.

Figure 4:
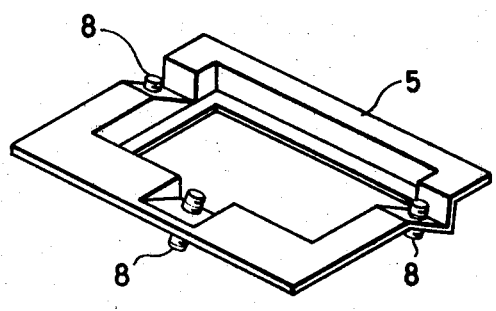
FIG. 4 is a perspective view of a focusing screen frame in the device in FIG. 3.

As shown in FIG. 4, three focusing adjusting screws 8 are provided on the focusing screen frame 5 at three points. Therefore, referring back to FIG. 3, the focusing screen 4 and the focusing screen frame 5, held between the prism support 3 and the focusing screen frame retaining spring 15 secured to the hinge 11, are abutted against the lower surface of the prism support 3 by the focusing adjusting screws 8, which are in turn urged upwardly by the elastic force of the spring 15, whereby the position of the focusing screen is adjustably fixed.

With the focusing screen holding device of the invention constructed as described above, even after the camera has been assembled, the focusing adjustment can be achieved by use of a screwdriver inserted through the opening of the mount 9. Therefore, in the manufacture of the camera, the degree of freedom in the arrangement of the focusing adjusting stop is increased, and the camera can be readily repaired or adjusted after sale.

With the use of the invention, dust can be readily removed from the focusing screen 4, and the focusing screen 4 can be replaced readily if damaged. By disengaging the end portion 11a of the hinge 11 from the mirror box 7, the hinge 11 can turn downwardly in FIG. 3 about the shaft 13a of the hinge. In this operation, since the focusing screen frame 5 is not secured to any stationary member, the frame 5 is allowed to drop as it is held on the hinge 11. Therefore, the frame 5, and accordingly the focusing screen 4, can be readily removed through the opening in the mount 9. Thus, if the focusing screen 4 becomes dusty, the dust can be readily removed. Also, if the focusing screen 4 is scratched, it can be readily replaced. Moreover, if desired, the focusing screen 4 can be easily replaced by a focusing screen of a different type.

As is apparent from the above description, although the focusing screen holding device of the invention is simple in construction, the position of the focusing screen 4 can be easily adjusted by the use of a screwdriver inserted through the opening in the mount after the camera has been assembled. Cleaning and replacing the focusing screen can be readily achieved.

What is claimed is:

1. A focusing screen holding device for a single-lens reflex camera having a focusing screen, comprising:
   a focusing screen holding frame;
   a plurality of focusing adjusting screws for adjusting a position of said focusing screen;
   a focusing screen retaining spring; and
   a hinge having first and second leaves, said focusing screen holding frame being mounted on said first leaf, said first leaf having a hook at an outer end thereof, said second leaf being secured to a mirror box of said camera so that said focusing screen holding frame is swingable about a shaft of said hinge, said hook being engagable with said mirror box so that said focusing screen holding frame is fixedly secured to said mirror box, said focusing screen retaining spring being located between said first leaf and said focusing screen holding frame, said focusing screen retaining spring exerting a depressing force on said focusing screen, said focusing screen being accessible through an opening of a lens mount to adjust and replace said focusing screen, said focusing adjusting screws being positioned so as to be accessible and adjustable through said opening in said lens mount.

2. The focusing screen holding device of claim 1 wherein said focusing adjusting screws are three in number, two of said focusing adjusting screws being provided on respective opposed side portions of said focusing screen holding frame and a third of said focusing adjusting screws being provided at a front of said focusing screen holding frame.

3. The focusing screen holding device of claim 2 wherein said focusing adjusting screws extend upwardly from notches provided in said focusing screen holding frame.

* * * * *